US008889202B2

(12) United States Patent
Baisier et al.

(10) Patent No.: US 8,889,202 B2
(45) Date of Patent: Nov. 18, 2014

(54) STEAMED CAKE DONUT

(75) Inventors: Paul Baisier, Brussels (BE); Jim Simko, Mount Laurel, NJ (US)

(73) Assignee: Puratos N.V., Groot-Bijgaarden (BE)

( * ) Notice: Subject to any disclaimer, the term of this patent is extended or adjusted under 35 U.S.C. 154(b) by 891 days.

(21) Appl. No.: 12/672,661

(22) PCT Filed: Aug. 13, 2007

(86) PCT No.: PCT/EP2007/058365
§ 371 (c)(1),
(2), (4) Date: Feb. 8, 2010

(87) PCT Pub. No.: WO2009/021553
PCT Pub. Date: Feb. 19, 2009

(65) Prior Publication Data
US 2012/0027886 A1 Feb. 2, 2012

(51) Int. Cl.
*A21D 13/08* (2006.01)
*A21D 8/04* (2006.01)
*A21D 2/00* (2006.01)
*A21D 10/04* (2006.01)
*A21D 13/00* (2006.01)
*A21D 6/00* (2006.01)
*A21D 8/06* (2006.01)
*A21D 10/00* (2006.01)
*A21D 15/02* (2006.01)

(52) U.S. Cl.
CPC ............ *A21D 13/0096* (2013.01); *A21D 6/001* (2013.01); *A21D 8/06* (2013.01); *A21D 10/005* (2013.01); *A21D 10/04* (2013.01); *A21D 15/02* (2013.01)
USPC ................ 426/19; 426/549; 426/554; 426/61

(58) Field of Classification Search
USPC ...................... 426/19, 61, 549, 554
See application file for complete search history.

(56) References Cited

U.S. PATENT DOCUMENTS

| 3,152,910 | A | * | 10/1964 | Sugihara et al. | 426/555 |
|---|---|---|---|---|---|
| 3,694,228 | A | * | 9/1972 | Hochhauser et al. | 426/241 |
| 4,066,797 | A | * | 1/1978 | McNair | 426/307 |
| 4,511,585 | A | * | 4/1985 | Durst | 426/106 |
| 4,929,464 | A | * | 5/1990 | Willyard et al. | 426/549 |
| 5,804,243 | A | * | 9/1998 | Loh et al. | 426/552 |
| 7,666,457 | B1 | * | 2/2010 | Lang et al. | 426/555 |
| 8,124,161 | B2 | | 2/2012 | Meijer et al. | |
| 2007/0042099 | A1 | * | 2/2007 | Stanton | 426/549 |
| 2008/0026130 | A1 | | 1/2008 | Meijer et al. | |
| 2008/0085352 | A1 | | 4/2008 | Meijer et al. | |
| 2009/0208628 | A1 | | 8/2009 | Meijer et al. | |

FOREIGN PATENT DOCUMENTS

| EP | 1077031 A2 * | 2/2001 | ............... A21D 8/04 |
|---|---|---|---|
| EP | 1 700 526 A1 | 9/2006 | |
| EP | 1 832 172 A1 | 9/2007 | |
| GB | 2 407 958 A | 5/2005 | |
| JP | 60-217862 A | 10/1985 | |
| JP | 9168365 A | 6/1997 | |
| JP | 10-150918 A | 6/1998 | |
| JP | 2003-325098 A | 11/2003 | |
| JP | 2005-052087 A | 3/2005 | |
| WO | WO 2006/096058 A1 | 9/2006 | |
| WO | WO 2006/096059 A1 | 9/2006 | |
| WO | WO 2007/105947 A1 | 9/2007 | |

OTHER PUBLICATIONS

The International Search Report issued in corresponding PCT Application No. PCT/EP2007/058365, mailed Jul. 24, 2008.
KTTV, Los Angeles, myFOXla.com. Posted Aug. 3, 2011. Fonuts: Better Than Doughnuts? 2 pages. Retrieved Oct. 26, 2012 from http://www.myfoxla.com/story/18401505/fonuts-better-than-doughnuts.

* cited by examiner

*Primary Examiner* — Humera Sheikh
*Assistant Examiner* — Bhaskar Mukhopadhyay
(74) *Attorney, Agent, or Firm* — Knobbe Martens Olson & Bear LLP

(57) ABSTRACT

The present invention relates to a steamed cake donut with a total fat content comprised between 7% and 18%, in particular comprised between 7% and 15%, more in particular comprised between 7% and 12%. The present invention further relates to methods and means (e.g. dry mix, batter) for preparing such donut. A donut of the invention can be stored in frozen state prior to or after steaming.

8 Claims, 3 Drawing Sheets

STEAMED CAKE DONUT

RELATED APPLICATIONS

This application is the U.S. National Phase filing under 35 U.S.C. §371 of PCT/EP2007/058365, filed Aug. 13, 2007, entitled "Steamed Cake Donut", which designated the United States and was published in English on Feb. 19, 2009.

FIELD OF THE INVENTION

The present invention relates to cake donuts with a reduced fat level and methods and means for preparing same.

BACKGROUND

There exists a global demand for low- or reduced-fat products. Donuts are consumed worldwide on a large scale. But fried donuts contain quite a lot of fat due to the frying process.

Therefore there is an interest in having donuts with lower amounts of fat.

Donuts generally fall into two broad categories: cake donuts, leavened by a baking powder chemical reaction which produces carbon dioxide; and yeast-raised donuts, leavened by yeast enzymes which react with sugar during fermentation to produce carbon dioxide and ethyl alcohol.

Conventional cake donuts are prepared from a batter which is deposited into hot oil for frying. Yeast-raised donuts are produced from a dough which is permitted to ferment before being fried in oil.

Both yeast raised and cake donuts contain approximately 25-30% fat of which 80-85% is absorbed frying fat.

While donuts are typically fried, they may also be baked. Several patent applications relate to baked donuts with possibly a reduced fat content compared to fried donuts.

U.S. Pat. No. 5,804,243 e.g. discloses a cake donut made with 20-30% of a thermally reversible gel. The reversible gel comprises insoluble water-binding fiber and thermally-reversible hydrocolloid agent. The donuts are baked in an oven at a temperature between 190 and 220° C.

Patent application US2006/0182865 discloses a process to obtain low fat donuts. In this process the donuts are baked in a convection oven at a temperature between 180 and 195° C.

A finished fried donut has a very characteristic short bite and soft texture, which is difficult to obtain through baking. Baking e.g. often results in a more dry bread-like substance.

EP 1 263 291 discloses a method for the production of baked yeast-raised donuts with the taste and texture of a fried yeast-raised donut, the method comprising two spraying steps to coat the donut with cooking fat, and an intervening baking step.

Thus far there appear to have been no proposals for preparing donuts other than by frying or baking.

Steamed baking applications are very popular in China, Japan and the rest of Asia (South-East Asia), yet steaming applications appear to have been limited thus far to steamed buns, breads and the like (see e.g. JP10150918 and patent application US2002/0031575).

AIMS OF THE INVENTION

It is an aim of the invention to overcome drawbacks in the art.

It is an aim of the invention to provide steamed cake donuts that resemble fried donuts, yet with a reduced fat content (e.g. by 30-50%) compared to a conventional fried cake donut.

Aim is hereby to maintain organoleptic and textural characteristics of a conventional fried cake donut like for instance a short bite, soft texture, a smooth skin with a minimum of cracking.

A further aim is to provide cake donut mixes and a batter that allow preparing a cake donut according to the invention.

SUMMARY OF THE INVENTION

Figure 1:
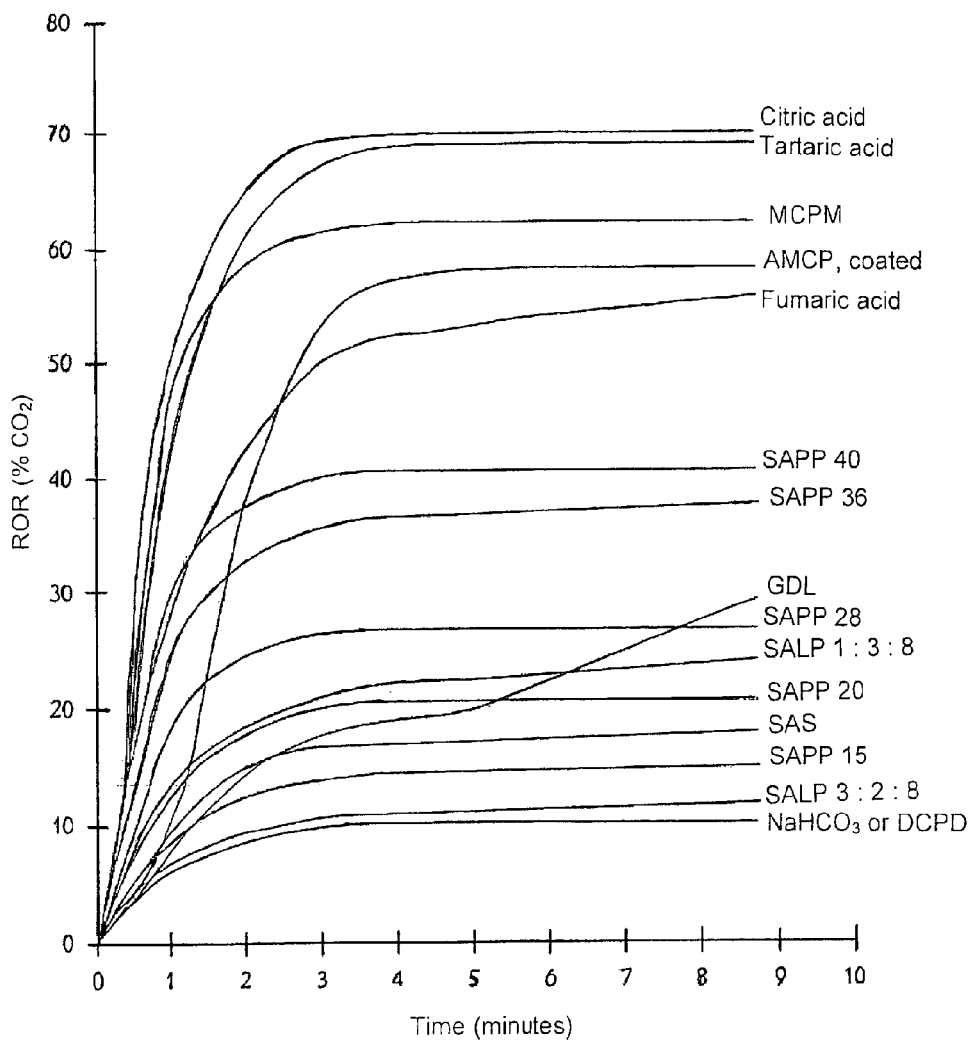
FIG. 1 presents a graph giving the rate of reaction (% $CO_2$ production) in function of the time. Source: "Chemical leavening acids".

A first aspect of the invention concerns a (chemically leavened) steamed cake donut, more in particular a (chemically leavened) steamed cake donut with a total fat content comprised between 7% and 18%, preferably comprised between 7 and % 15%, more preferably comprised between 7% and 12%.

In particular, a steamed cake donut of the invention looks and tastes as good as a normal fried donut.

The cake donut of the invention may be frozen prior to or after steaming.

A second aspect of the invention concerns a mix (or a blend), in particular a dry mix for preparing a steamed donut according to the invention. In said mix the ingredients are in particular homogeneously blended together. This blend typically contains a small amount (e.g. 3-6%) of moisture contributed by the moisture content of specific ingredients.

The term "dry mix" as used herein refers to a mix (or composition) with a dry matter content of at least 85%, more preferably at least 92%. More typically the dry mix of the invention has a dry matter content of 94-97%. The mix (or composition) of the invention in particular is a powdery mix (or powdery composition), more in particular a powdery mix with a consistency/texture like that of e.g. cocoa powder (cfr a greasy powder).

The invention in particular concerns a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

- wheat flour in an amount comprised between 30 wt % and 50 wt % (weight %), more preferably in an amount comprised between 40 wt % and 48 wt %,
- a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 0.75 wt % and 2 wt %, more preferably in an amount comprised between 1 wt % and 1.75 wt %, sugar in an amount comprised between 22 wt % and 32 wt %, more preferably in an amount comprised between 25 wt % and 30 wt %, egg yolk in an amount comprised between 3 wt % and 10 wt %, more preferably in an amount comprised between 6 wt % and 9 wt %, emulsifiers in an amount comprised between 0.1 wt % and 4 wt %, more preferably in an amount comprised between 2 wt % and 3 wt %, and edible fat in an amount for reaching a total fat content (of the mix) that is comprised between 8% and 16%, more preferably is comprised between 10% and 14%.

Preferably a mix of the invention further comprises at least one enzyme (in particular 1, possibly 2, 3 or more enzymes) for assuring a short bite and soft mouthfeel. Said enzyme(s) is/are preferably present in an amount comprised between 0.01 wt % and 2 wt %, more preferably in an amount comprised between 0.03 wt % and 1 wt %. Said (at least one) enzyme preferably is an amylase.

The invention in particular concerns a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

wheat flour in an amount comprised between 30 wt % and 50 wt % (weight %), more preferably in an amount comprised between 40 wt % and 48 wt %, a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 0.75 wt % and 2 wt %, more preferably in an amount comprised between 1 wt % and 1.75 wt %, sugar in an amount comprised between 22 wt % and 32 wt %, more preferably in an amount comprised between 25 wt % and 30 wt %, egg yolk in an amount comprised between 3 wt % and 10 wt %, more preferably in an amount comprised between 6 wt % and 9 wt %, emulsifiers in an amount comprised between 0.1 wt % and 4 wt %, more preferably in an amount comprised between 2 wt % and 3 wt %, edible fat in an amount for reaching a total fat content (of the mix) that is comprised between 8% and 16%, more preferably is comprised between 10% and 14%, and at least one enzyme (in particular 1, possibly 2, 3 or more enzymes) for assuring a short bite and soft mouthfeel, said enzyme(s) being present in an amount comprised between 0.01 wt % and 2 wt %, more preferably in an amount comprised between 0.03 wt % and 1 wt %.

Said (at least one) enzyme preferably is an amylase.

A mix of the invention (any of the above) advantageously further comprises milk proteins, said milk proteins preferably being present in an amount comprised between 0.1 wt % and 4 wt %, more preferably in an amount comprised between 1 wt % and 3 wt %.

A mix of the invention (any of the above) advantageously further comprises salt, said salt preferably being present in an amount comprised between 0.1 wt % and 4 wt %, more preferably in an amount comprised between 0.7 wt % and 2 wt %.

A mix of the invention (any of the above) advantageously further comprises starch, said starch preferably being present in an amount comprised between 0.1 wt % and 5 wt %, more preferably in an amount comprised between 1 wt % and 3 wt %.

A mix of the invention (any of the above) advantageously further comprises hydrocolloids, said hydrocolloids preferably being present in an amount comprised between 0.1 wt % and 2.5 wt %, more preferably in an amount comprised between 0.2 wt % and 1 wt %.

Weight percentages are herein on the total weight of the dry mix.

A preferred embodiment concerns a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

wheat flour in an amount comprised between 30 wt % and 50 wt %, more preferably in an amount comprised between 40 wt % and 48 wt %, a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 0.75 wt % and 2 wt %, more preferably in an amount comprised between 1 wt % and 1.75 wt %, sugar in an amount comprised between 22 wt % and 32 wt %, more preferably in an amount comprised between 25 wt % and 30 wt %, egg yolk in an amount comprised between 3 wt % and 10 wt %, more preferably in an amount comprised between 6 wt % and 9 wt %, emulsifiers in an amount comprised between 0.1 wt % and 4 wt %, more preferably in an amount comprised between 2 wt % and 3 wt %, edible fat in an amount for reaching a total fat content (of the mix) that is comprised between 8% and 16%, more preferably is comprised between 10% and 14%, at least one enzyme (in particular 1, possibly 2, 3 or more enzymes) for assuring a short bite and soft mouthfeel, said enzyme(s) being present in an amount comprised between 0.01 wt % and 2 wt %, more preferably in an amount comprised between 0.03 wt % and 1 wt %, milk proteins in an amount comprised between 0.1 wt % and 4 wt %, more preferably in an amount comprised between 1 wt % and 3 wt %, salt in an amount comprised between 0.1 wt % and 4 wt %, more preferably in an amount comprised between 0.7 wt % and 2 wt %, starch in an amount comprised between 0.1 wt % and 5 wt %, more preferably in an amount comprised between 1 wt % and 3 wt %, and hydrocolloids in an amount comprised between 0.1 wt % and 2.5 wt %, more preferably in an amount comprised between 0.2 wt % and 1 wt %.

An even more preferred embodiment concerns a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

wheat flour in an amount comprised between 40 wt % and 48 wt %, a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 1 wt % and 1.75 wt %, sugar in an amount comprised between 25 wt % and 30 wt %, egg yolk in an amount comprised between 6 wt % and 9 wt %, emulsifiers in an amount comprised between 2 wt % and 3 wt %, edible fat in an amount for reaching a total fat content (of the mix) that is comprised between 10% and 14%, at least one enzyme for assuring a short bite and soft mouthfeel, said enzyme(s) being present in an amount comprised between 0.03 wt % and 1 wt %, milk proteins in an amount comprised between 1 wt % and 3 wt %, salt in an amount comprised between 0.7 wt % and 2 wt %, starch in an amount comprised between 1 wt % and 3 wt %, and hydrocolloids in an amount comprised between 0.2 wt % and 1 wt %.

A mix of the invention (any of the above) may further comprise dextrose in an amount up to 5 wt %, more preferably in an amount comprised between 0.01 wt % and 4 wt %.

A mix of the invention (any of the above) may further comprise cocoa powder in an amount up to 6 wt %, more preferably in an amount comprised between 0.01 wt % and 5.3 wt %.

A mix of the invention (any of the above) may further comprise at least one coloring agent and/or at least one flavor in an amount up to 2.5 wt %, more preferably in an amount comprised between 0.02 wt % and 1 wt %.

Further provided in the present invention is a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

wheat flour in an amount comprised between 30 wt % and 50 wt % (weight %), more preferably in an amount comprised between 40 wt % and 48 wt %, a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 0.75 wt % and 2 wt %, more preferably in an amount comprised between 1 wt % and 1.75 wt %, sugar in an amount comprised between 22 wt % and 32 wt %, more preferably in an amount comprised between 25 wt % and 30 wt %, egg yolk in an amount comprised between 3 wt % and 10 wt %, more preferably in an amount comprised between 6 wt % and 9 wt %, emulsifiers in an amount comprised between 0.1 wt % and 4 wt %, more preferably in an amount comprised between 2 wt % and 3 wt %, edible fat in an amount for reaching a total fat content (of the mix) that is comprised between 8% and 16%, more preferably is comprised between 10% and 14%, said mix further comprising milk proteins, salt, starch, hydrocolloids, and preferably also at least one enzyme (in particular 1, possibly 2, 3 or more enzymes) for assuring a short bite and soft mouthfeel.

Said (at least one) enzyme preferably is an amylase.

Further provided in the present invention is a dry mix (suitable) for preparing a steamed cake donut according to the invention (in particular a steamed cake donut with a total fat content comprised between 7% and 18%, preferably comprised between 7% and 15%, more preferably comprised between 7% and 12%), said mix comprising (or consisting of):

wheat flour in an amount comprised between 40 wt % and 48 wt %, a chemical leavening system comprising (or consisting of) a carbon dioxide carrier and one or more leavening acids (in particular 1, possibly 2, 3 or more leavening acids) with a rate of reaction comprised between 15 and 45, more preferably comprised between 18 and 42, said leavening system being present in an amount comprised between 1 wt % and 1.75 wt %, sugar in an amount comprised between 25 wt % and 30 wt %, egg yolk in an amount comprised between 6 wt % and 9 wt %, emulsifiers in an amount comprised between 2 wt % and 3 wt %, edible fat in an amount for reaching a total fat content (of the mix) that is comprised between 10% and 14%, said mix further comprising milk proteins, salt, starch, hydrocolloids, and preferably also at least one enzyme (in particular 1, possibly 2, 3 or more enzymes) for assuring a short bite and soft mouthfeel.

Said (at least one) enzyme preferably is an amylase.

Said mix(es) may further comprise dextrose in an amount up to 5 wt %, more preferably in an amount comprised between 0.01 wt % and 4 wt %.

Said mix(es) may further comprise cocoa powder in an amount up to 6 wt %, more preferably in an amount comprised between 0.01 wt % and 5.3 wt %.

Said mix(es) may further comprise at least one coloring agent and/or at least one flavor in an amount up to 2.5 wt %, more preferably in an amount comprised between 0.02 wt % and 1 wt %.

Advantageously, said milk proteins, salt, starch, hydrocolloids, enzymes and possibly other optional ingredients (such as dextrose, cocoa powder, flavors and/or coloring agents) are present in an amount sufficient for reaching 100% by weight. Preferred amounts for the milk proteins, salt, starch, hydrocolloids and the enzyme(s) are as given above.

In a mix of the invention (any of the embodiments) the total sum of ingredients is not exceeding 100 wt %.

The wheat flour used in a mix of the invention (any of the above) advantageously is a mixture of soft wheat flour (e.g. pastry flour) and hard wheat flour (e.g. bread flour). Advantageously the ratio of soft wheat flour to hard wheat flour is between 2.7:1 and 1.5:1, preferably is between 2.5:1 and 1.7:1. In an embodiment of the invention this ratio is approximately 2:1. The preferred ratio of soft to hard wheat flour may, however, depend from country to country, depending on the protein content, the ash content, moisture content, baking characteristics of the respective flour(s) as well as their availability. A person skilled in the art will easily determine a suitable ratio between soft wheat flour and hard wheat flour.

A "soft" wheat flour typically has a protein content of (approximately) 8-10 wt %, an ash content of (approximately) 0.35-0.45 wt %, and a moisture content of (approximately) 12-13%. A "hard" wheat flour typically has a protein content of (approximately) 12-13 wt %, an ash content of (approximately) 0.45-0.55 wt %, and a moisture content of (approximately) 13-13.9%.

In the above, protein and ash content are based on a 14% moisture basis. Protein content is typically measured with the Kjeldahl method (AACC Method 46-10). Ash content is typically measured using a small lab furnace (AACC Method 08-01). Moisture content is typically measured using a lab air oven (AACC Method 44-15A). AACC stands herein for American Association for Cereal Chemists (a recognized authority in the USA for cereal science methodology). Protein quality of hard wheat flour, where needed, can also be determined by using a farinograph.

The term "chemical leavening" refers to leavening by a baking powder chemical reaction which produces carbon dioxide, as opposed to a yeast-leavening producing carbon dioxide and ethyl alcohol.

A "chemical leavening system" as used herein comprises (or consists of) a source of carbon dioxide (referred to as a carbon dioxide carrier) and one or more (in particular 1, possibly 2, 3 or more) leavening acids. The leavening system may further comprise an inert filler or diluent (e.g. starch).

In particular, the chemical leavening system consists of a carbon dioxide carrier, one or more leavening acids (in particular 1, possibly 2, 3 or more leavening acids), and possibly an inert filler or diluent (e.g. starch).

A typical example of a carbon dioxide carrier is sodium bicarbonate, but it may e.g. also be ammonium carbonate, ammonium bicarbonate or potassium bicarbonate.

The term "leavening acid" refers to a group of food grade acids or acid salts that are reacted with a source of carbon dioxide (such as sodium bicarbonate) to liberate carbon dioxide. The one or more leavening acids used in the framework of the invention advantageously are slow(er) acting leavening acids.

In an embodiment of the invention the chemical leavening system added to (present in) a mix of the invention is one comprising (or consisting of) a carbon dioxide carrier and one or more leavening acids (in particular 1, possibly 2, 3 or more leavening acids) with a rate of reaction comprised between 15 and 45, more preferably comprised between 18 and 42. As indicated above, said leavening system advantageously is added to (present in) said mix in an amount comprised between 0.75 wt % and 2 wt %, more preferably comprised between 1 wt % and 1.75 wt %.

The "ROR" or "rate of reaction" is the rate at which carbon dioxide is released (from the batter stage on through the actual baking, frying or steaming process). In the present invention the ROR values specified refer to the amount of $CO_2$ (in percent) released from a defined amount of $NaHCO_3$ under standard conditions after 8 minutes through reaction with the relevant acid, under a constant temperature of 27° C. (FIG. 1). A standard method to measure the ROR is described in the book "Chemical leavening agents", $2^{nd}$ edition, by E Brose & al, edited by Chemische Fabrik Budenheim Rudolf A. Oetker (see for instance the sections 4.3.2 and 7.51 through 7.5.3, incorporated by reference herein). FIG. 1 corresponds to a Figure taken from said Book.

Examples of leavening acids with the desired ROR (rate of reaction) are sodium acid pyrophosphate (SAPP), calcium acid pyrophosphate, sodium aluminum phosphate (SALP), and/or Glucono Delta Lactone (GDL). In an embodiment of the invention the leavening acid is sodium acid pyrophosphate. In another embodiment the leavening acid is calcium acid pyrophosphate. In yet another embodiment the leavening acid is sodium aluminum phosphate. In yet another embodiment the leavening acid is Glucono Delta Lactone. A preferred leavening acid is sodium acid pyrophosphate (e.g. SAPP20, SAPP28, SAPP36, SAPP40). One particularly preferred leavening acid is SAPP40. Another particularly preferred leavening acid is SAPP28. Advantageously the at least one leavening acid (preferably sodium acid pyrophosphate) is present in an amount comprised between 0.5 wt % and 1 wt % (percentages on the total weight of the mix).

In an embodiment of the invention 1 leavening acid selected from the group of sodium acid pyrophosphate, calcium acid pyrophosphate, sodium aluminum phosphate, and Glucono Delta Lactone is present in the leavening system of the invention. Possibly a combination of 2, 3, or more leavening acids selected from this group is present herein (e.g. a combination of different sodium acid pyrophosphates, a combination of sodium acid pyrophosphate and Glucono Delta Lactone etc).

In an embodiment of the invention a chemical leavening system comprising (or consisting of) a carbon dioxide carrier and one or more leavening acids (in particular 1, possibly 2, 3 or more leavening acids) selected from the group consisting of sodium acid pyrophosphate, calcium acid pyrophosphate, sodium aluminum phosphate, and/or Glucono Delta Lactone are added to (present in) a mix of the invention. Advantageously said leavening system is added (present) in an amount comprised between 0.75 wt % and 2 wt %, more preferably in an amount comprised between 1 wt % and 1.75 wt %. Advantageously the at least one leavening acid (in particular sodium acid pyrophosphate) is present in an amount comprised between 0.5 wt % and 1 wt %. In a preferred embodiment, sodium acid pyrophosphate (e.g. SAPP40), possibly a combination of different sodium acid pyrophosphates (e.g. SAPP40 and SAPP28) is present in an amount comprised between 0.5 wt % and 1.0 wt % (percentage on the total weight of the mix).

The sugar as used in a mix of the invention (any of the above) may include, but is not limited to sucrose (beet or cane type) and corn sugar (dextrose). The sugar may, however, also be a sugar alcohol such as maltitol. The sugar can also be a polydextrose (e.g. if bulking is needed). When wanting to prepare a Sugar free or Reduced Calorie steamed cake donut one may also use sugar replacers, e.g. a sweetening, more in particular a sweetening intensified with acesulfame k, aspartame or sucralose (e.g. Splenda™). Optionally, a mix of the invention may comprise up to 5 wt % of dextrose, in particular between 0.01 wt % and 4 wt % dextrose.

In a mix of the invention (any of the above) egg yolk may be provided in the form of dried egg yolk (or egg yolk powder) or in the form of powdered whole eggs. Dried egg yolk is preferred. In countries where the quality of the yolk, or whole eggs would be poor, one may consider the addition of egg whites (albumen). Addition of a minor amount of egg white (e.g. 0.1-0.3 wt %) proved further useful when preparing steamed vanilla cake donuts.

The total fat content of a mix of the invention advantageously is comprised between 8% and 16%, more preferably is comprised between 10% and 14%. The "total fat content" typically refers to the total combination of solid fats, oils, shortening, emulsifiers as present, and additional "fat" contributed by other ingredients (e.g. fat found in the egg yolk, milk, cocoa powder, etc.). The term "fat" herein refers to triglycerides of fatty acids.

The fat content of a mix of the invention (any of the above) is determined with the AOAC (American Oil Chemists Association) method 963.15. Briefly, this method is a Soxhlet based extraction method wherein the product to be analyzed is first dried for 16 hours at 80° C., mixed and then Soxhlet extracted with ether.

Part of the total fat content is derived from emulsifiers added. The emulsifiers used in a mix of the invention (any of the above) may include, but are not limited to mono- and diglycerides, DATEM and/or lecithin. In particular the emulsifier may comprise monoglycerides, DATEM and lecithin. A preferred emulsifier is lecithin. In an embodiment of the invention monoglycerides are present in an amount comprised between 1 wt % and 2 wt %, DATEM in an amount comprised between 0.2 wt % and 0.5 wt % and lecithin in an amount comprised between 0.15 wt % and 0.3 wt % (percentages on the total mix weight).

The major part of the total fat content comes from edible fat added. The edible fat used can be an oil (liquid at room temperature), a solid or semi-solid fat (solid or semi-solid at room temperature), a shortening or a combination of any of these (e.g. a combination of shortening and oil, e.g. a combination of several (different) shortenings).

Advantageously a vegetable (edible) fat derived from soybean, cottonseed, rapeseed, or palm is used, in particular one derived from soybean. The degree of hydrogenation is not important for the present invention. The edible fats (solid or semi-solid at room temperature), oils and/or shortening can thus be non-hydrogenated, partially hydrogenated, or fully hydrogenated depending on the application.

Typically the edible fat is added to (present in) a mix of the invention in an amount comprised between 6 wt % and 10 wt %, typically in an amount comprised between 7 wt % and 8.5 wt %.

Accordingly, in an embodiment of the invention edible fat, in particular (semi)solid fats, oils and/or shortening are added to (present in) the mix in an amount comprised between 6 wt % and 10 wt %, typically in an amount comprised between 7 wt % and 8.5 wt %.

The edible fat can be a shortening, such as a vegetable shortening, in particular a hard vegetable shortening, but may also be a combination of a shortening and oil, e.g. a vegetable shortening and a vegetable oil.

In an embodiment of the invention a (vegetable) shortening is added (present) in an amount comprised between 5 wt % and 8 wt % and a (vegetable) oil in an amount comprised between 1 wt % and 3 wt %. Advantageously the ratio of shortening to oil is between 2:1 and 4:1, more preferably is (around) 3:1.

An enzyme that assures a short bite and soft mouthfeel in particular is an amylase. The amylase can be a fungal, a cereal or a bacterial amylase. These enzymes are advantageous for improving and maintaining crumb softness (steamed bakery products having the tendency to dry rather quickly). In particular, said amylase(s) is being added to the mix in powder form to avoid loss of activity.

The milk proteins used in a mix of the invention (any of the above) may include, but are not limited to any combination of nonfat dry milk, sweet whey and sodium caseinate. Advantageously the milk proteins are provided under the form of nonfat dry milk.

The salt used typically is sodium chloride but it may also be a salt replacer.

The starch(es) used in a mix of the invention (any of the above) may include, but are not limited to wheat starch, corn starch and/or potato starch which (any of these) may be in modified or unmodified form.

The hydrocolloid(s) used in a mix of the invention (any of the above) may include, but are not limited to xanthan gum, guar gum, carboxymethylcellulose (CMC), arabic gum and/or any combination of these (e.g xanthan and guar gum).

The cocoa powder which may be used in a mix of the invention (any of the above) may include, but is not limited to a natural cocoa powder and/or cocoa powder processed with alkali (e.g. cocoa red 10/12% fat and/or cocoa black 10/12% fat, alkalized).

The flavor(s) and/or coloring agent(s) which may be used in a mix of the invention (any of the above) may include, but are not limited to natural and artificial flavors, spices, fruit and/or fruit flavored inclusions, beta carotene, caramel colour, annatto & tumeric vegetable colours, and/or artificial colours. Examples of flavors or flavoring agents are e.g. vanilla, chocolate, spice, fruit pieces, and/or sour cream. The following types of steamed caked donuts could e.g. be prepared with a recipe according to the invention: vanilla, chocolate, ginger, green tea, and spice donuts.

A further aspect of the invention concerns a batter for preparing a steamed cake donut of the invention, in particular a steamed cake donut with a total fat content comprised between 7% and 18%, preferably comprised between 7% and 15%, more preferably comprised between 7% and 12%.

Said batter may be prepared by (thoroughly) mixing the dry ingredients with basically water, or with water and oil, to produce a cohesive and uniform blend.

As there is a maximum level of fat that can be carried by the dry ingredients (higher levels will e.g. cause clumping of the product, difficulties with packing), the extra fat eventually required for the finished product is then added at the bowl along with the water.

Advantageously a batter is prepared from a mix according to the invention. A batter of the in invention is basically a hydrated version of a dry mix according to the invention.

The amount of water is one sufficient to hydrate the dry ingredients and to obtain a uniform batter of the desired consistency.

The addition of water activates the ingredients contained in the dry mix. Water is typically added in an amount comprised between 20 wt % and 35 wt %, more preferably in an amount comprised between 25 wt % and 30 wt % (percentages being on the total weight of the batter).

A batter of the invention is advantageously prepared by adding water (and possibly some oil) and, optionally, other ingredients such as e.g. vitamins, antioxidants, cholesterol lowering glucans, omega 3 fatty acids, and flaxseed to a mix according to the invention.

An embodiment of the invention concerns a batter for preparing a steamed cake donut of the invention (in particular a steamed cake donut with a total fat content comprised between 7% and 18%, preferably comprised between 7% and 15%, more preferably comprised between 7% and 12%), said batter comprising (or consisting of):
- water added in an amount comprised between 20 wt % and 35 wt %, more preferably in an amount comprised between 25 wt % and 30 wt % (weight percentage),
- wheat flour in an amount comprised between 20 wt % and 40 wt %, more preferably in an amount comprised between 27 wt % and 35 wt %,
- a chemical leavening system comprising (or consisting of) a carbon dioxide carrier and one or more leavening acids (in particular 1, possible 2, 3 or more leavening acids) with a rate of reaction comprised between 15 and 45, more preferably comprised between 18 and 42, said leavening system being present in an amount comprised between 0.5 wt % and 1.40 wt %, more preferably in an amount comprised between 0.75 wt % and 1.25 wt %, sugar in an amount comprised between 15 wt % and 25 wt %, more preferably in an amount comprised between 17 wt % and 24 wt %, egg yolk in an amount comprised between 2 wt % and 7 wt %, more preferably in an amount comprised between 4 wt % and 6 wt %, emulsifiers in an amount comprised between 0.1 wt % and 3 wt %, more preferably in an amount comprised between 2 wt % and 2.3 wt %, edible fat in an amount for reaching a total fat content (of the batter) that is comprised between 7% and 18%, preferably is comprised between 7% and 15%, more preferably is comprised between 7% and 12%, at least one enzyme (in particular 1, possible 2, 3 or more enzymes) for assuring a short bite and soft mouthfeel, said enzyme(s) being present in an amount comprised between 0.01 wt % and 1.5 wt %, more preferably in an amount comprised between 0.03 wt % and 0.8 wt %, milk proteins in an amount comprised between 0.1 wt % and 3 wt %, more preferably in an amount comprised between 1 wt % and 2.3 wt %, salt in an amount comprised between 0.1 wt % and 3 wt %, more preferably in an amount comprised between 0.7 wt % and 1.5 wt %, starch in an amount comprised between 0.1 wt % and 4 wt %, more preferably in an amount comprised between 1 wt % and 2.4 wt %, and hydrocolloids in an amount comprised between 0.1 wt % and 2 wt %, more preferably in an amount between 0.2 wt % and 0.8 wt %, the total sum of ingredients not exceeding 100 wt %. Weight percentages are on the total weight of the batter.

A preferred embodiment of the invention concerns a batter for preparing a steamed cake donut of the invention (in particular a steamed cake donut with a total fat content comprised between 7% and 18%, preferably comprised between 7% and 15%, more preferably comprised between 7% and 12%), said batter comprising (or consisting of):

water added in an amount comprised between 25 wt % and 30 wt %, wheat flour in an amount comprised between 27 wt % and 35 wt %, a chemical leavening system comprising (or consisting of) a carbon dioxide carrier and one or more leavening acids (in particular 1, possible 2, 3 or more leavening acids) with a rate of reaction comprised between 45 and 25, more preferably comprised between 42 and 28, said leavening system being present in an amount comprised between 0.75 wt % and 1.25 wt %, sugar in an amount comprised between 17 wt % and 24 wt %, egg yolk being present in an amount comprised between 4 wt % and 6 wt %, emulsifiers in an amount comprised between 2 wt % and 2.3 wt %, edible fat in an amount for reaching a total fat content (of the batter) that is comprised between 7% and 18%, preferably is comprised between 7% and 15%, more preferably is comprised between 7% and 12%, at least one enzyme (in particular 1, possible 2, 3 or more enzymes) for assuring a short bite and soft mouthfeel, said enzyme(s) being present in an amount comprised between 0.03 wt % and 0.8 wt %, milk proteins in an amount comprised between 1 wt % and 2.3 wt %, salt in an amount comprised between 0.7 wt % and 1.5 wt %, starch in an amount comprised between 1 wt % and 2.4 wt %, and hydrocolloids in an amount comprised between 0.2 wt % and 0.8 wt %, the total sum of ingredients not exceeding 100 wt %. Weight percentages are on the total weight of the batter.

Said (at least one) enzyme preferably is an amylase.

A batter of the invention (any of the above) may further comprise dextrose in an amount up to 4 wt %, more preferably in an amount comprised between 0.008 wt % and 3.2 wt %.

A batter of the invention (any of the above) may further comprise cocoa powder in an amount up to 5 wt %, more preferably in an amount comprised between 0.008 wt % and 4 wt %.

A batter of the invention (any of the above) may further comprise at least one coloring agents and/or at least one flavor in an amount up to 2 wt %, more preferably in an amount comprised between 0.02 wt % and 0.8 wt %.

A batter according to the invention, due to its high fat content, is not suitable for preparing regular donuts by frying as demonstrated below. A person skilled in the art would immediately recognize this.

Yet a further aspect of the invention concerns a method of preparing a steamed cake donut according to the invention.

In particular, provided is a method for preparing a steamed cake donut of the invention (in particular a steamed cake donut with a total fat content comprised between 7% and 18%, preferably comprised between 7% and 15%, more preferably comprised between 7% and 12%), said method comprising the steps of providing a batter of the invention (any of the above), forming (e.g. cutting, either by hand or via machine-cutting) a donut piece out of said batter, and steaming the donut piece.

The step of providing said batter may comprise the step of preparing a batter by mixing the dry ingredients with water, or with water and oil and possibly some additional ingredients, to form a uniform batter. In a preferred embodiment a batter is prepared from a dry mix according to the invention.

The step of forming a donut piece or of making donut-shaped forms from said batter may comprise the step of hand-cutting or machine-cutting the batter into donut pieces or into donut-shaped forms.

Depending on the size and thickness of the donut pieces, the donut piece is steamed for at least 1, preferably at least 2 minutes, typically for 4 up to 6 minutes, in general less than 10 minutes. The steaming time applied is one sufficient to obtain a steamed cake donut, and may depend on the application.

Advantageously, the temperature of the cake donut batter before steaming is (around) 20 to 25° C., preferably is (around) 22 to 24° C., most preferably is around 22.8° C. (±0.1° C.).

Where desired the donut of the invention may be frozen before (as a piece of batter having the form of a donut) or after steaming.

A method of the invention (any of the above) may further comprise the step of covering a donut according to the invention with glaze, icing or sugar. Suitable glazes are well known in the art.

A method of the invention (any of the above) may further comprise the step of injecting a filling into a donut according to the invention. Suitable fillings are well known in the art.

Yet another aspect of the invention concerns a steamed cake donut obtainable by a method according to the invention (any of the above).

Still a further aspect of the invention concerns a steamed cake donut prepared from a batter according to the invention (any of the above).

A last aspect of the invention concerns the use of a mix according to the invention (any of the above) or of a batter according to the invention (any of the above) for the preparation of a steamed cake donut.

The invention will be described in further details in sequel by reference to the enclosed drawings, which are not in any way intended to limit the scope of the invention as claimed.

DESCRIPTION OF THE INVENTION

The present invention provides for a method and means to obtain quality cake donuts with a reduced-fat content that have characteristics/properties similar to those of "conventional" fried donuts.

Advantageously a (finished) cake donut according to invention has a total fat content comprised between 7% and 18%, preferably comprised between 7 and % 15%, more preferably comprised between 7% and 12%.

Advantageously the fat content of a steamed donut of the invention is reduced by 30-50%, more preferably by at least 50%, compared to a conventional fried cake donut (product obtained by the classical frying process).

Typically total fat content in a steamed cake donut according to the invention is between 7% and 18%, preferably between 7% and 15%, more preferably between 7% and 12%.

Provided in the invention are cake donut mixes and a batter specifically adapted so that the finished donut of the invention—though steamed—will have characteristics and properties similar to that of a (conventional) fried donut.

Figure 2:
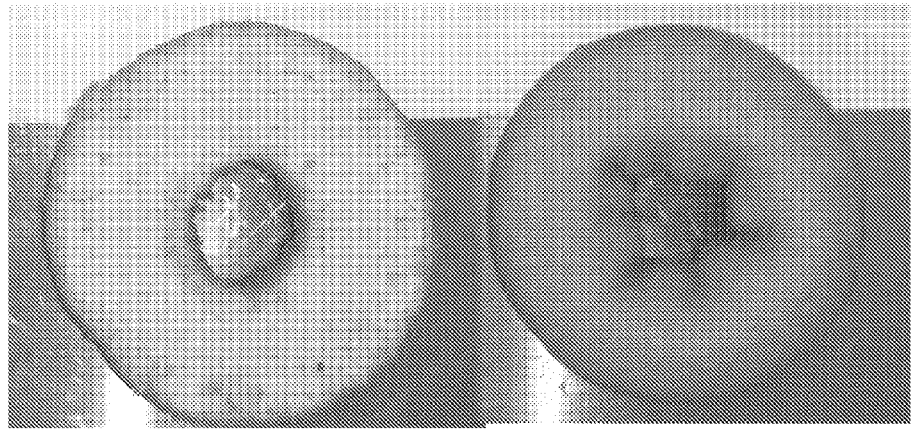
FIG. 2 presents a conventional fried and hand-cut donut: interior (left), exterior (right).
Figure 3:
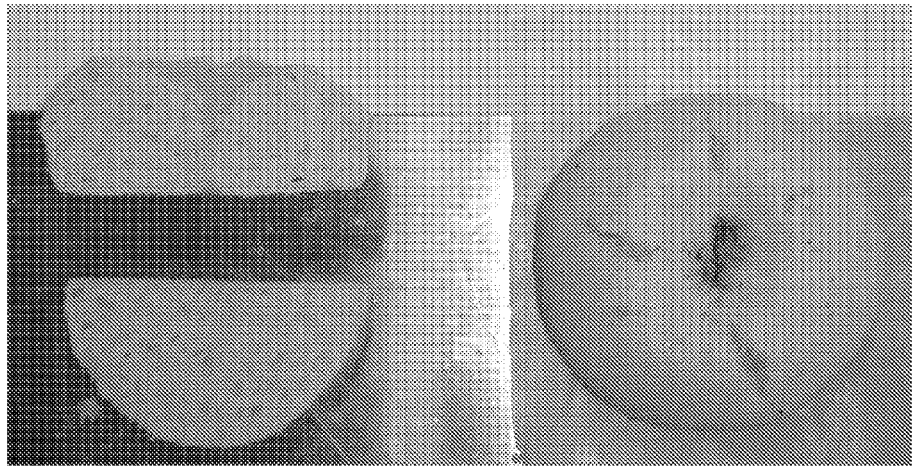
FIG. 3 presents a steamed hand-cut cake donut prepared according to a conventional recipe for fried donuts: interior (left), exterior (right).

Donuts have preferably the following properties:
a stable round structure,
good volume,
smooth and soft texture,
no or minimal cracking on the surface, and
a short bite mouth feel The preparation of donuts using a standard donut recipe but cooked by steaming will give products that do not resemble a "fried" donut with the expected quality parameters (compare the donut of FIG. 2 with that of FIG. 3).

Such products (FIG. 3) have an irregular volume. The symmetry of the donut is less than normal without a visible center hole. Cracks appear on the donut surface. The resulting donuts no longer eat like a fried donut. The texture is very dry and crumbly. The products lack uniform symmetry and have an unpleasant mouth feel (chewy, dry). Furthermore, the shelf life is reduced considerably (loss of mouthfeel and texture).

The main differences in the steaming process compared to the conventional frying process are the 'baking/cooking' temperature (100° C. instead of 190° C.), the 'baking/cooking' environment (steam versus oil) and the 'baking/cooking' time.

These process parameters result in a totally different heat transfer system and in a totally different ingredient absorption (water versus frying oil) during the 'baking/cooking' process.

In the present invention, novel and inventive compositions (cake donut mix, batter) are provided that overcome the difficulties linked to these process changes.

The inventors discovered e.g. that the leavening system had to be adapted to the lower processing temperatures and longer processing times (steaming process is around 100° C.). The leavening system of the invention also compensates for lack of a "turning phase" or flipping of the actual donut which occurs during a conventional fat frying process, but, not during a steaming process.

The leavening acids used in commercial fried cake donut mixed were found to react too fast for the lower temperatures and longer processing times and resulted in steamed donuts with poor symmetry, with a "puckered" center hole, resulted in a ball type donut or no center hole at all. The inventors also discovered that it was advantageous to use an amount of leavening agent(s) that is somewhat lower (e.g. 20-30% lower) than the normal level of leavening agent(s) typically found in a conventional cake donut mix.

The inventors further discovered to their surprise that it was advantageous to use an amount of flour that is somewhat lower (e.g. 15-20% lower) than the normal level of flour as this better mimics the crumb texture of a conventional donut.

The use of the conventional (higher) levels of flour caused the steamed donuts to become non-cohesive and contributed to a crumb structure with a longer bite that was very dry.

Advantageously, a donut of the invention is prepared from a batter having a higher than normal (total) fat level to assure a short bite and soft mouthfeel during the expected shelf life. Advantageously, a batter used for preparing a steamed cake donut of the invention has a total fat content of 7-18%, more preferably 7-15%, more preferably 7-12%.

High levels of fat are not found in conventional donut mixes due to the resulting high fat absorptions during a typical frying process (in oil), contrary to a steaming process (wherein no extra fat is absorbed through the surface of the donut).

The inventors further found that a higher than normal level of egg yolk was required to provide eating qualities similar to those found in a fried cake donut.

Specific enzymes such as amylases are advantageously and preferably added to assure a short bite and soft mouthfeel during the expected shelf life.

Flavors and/or colouring agents are fully optional yet may be advantageous to duplicate the taste/varieties found in the mixes that are currently available for fried cake donuts (including, but not limited to: vanilla, chocolate, spice, fruit flavors (found for example in fruit bits or fruit pieces), sour cream, etc.).

Figure 4:
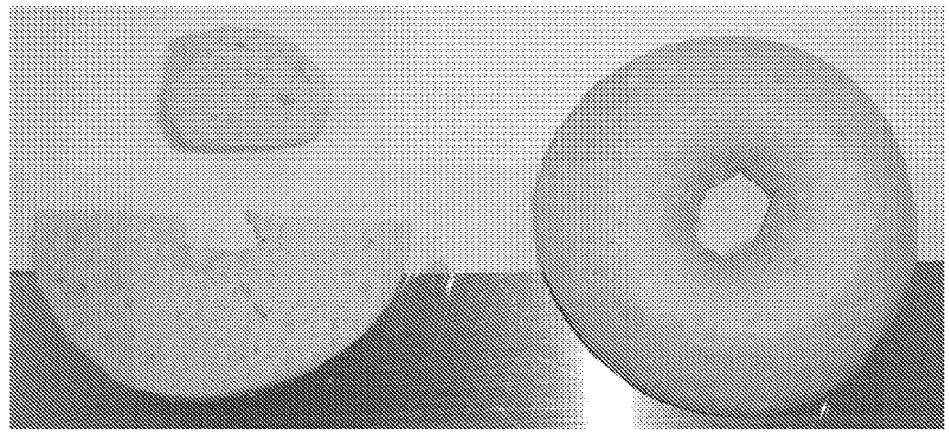
FIG. 4 presents a steamed hand-cut cake donut according to the invention: interior (left), exterior (right).

The uniqueness of the present invention is that a conventional cake donut mix (for fried donuts) will not produce a quality steamed cake donut (FIG. 3), and vice versa. A steamed cake donut mix of the invention will not produce a quality fried cake donut (FIG. 5), due to a unique combination of leavening system, fat system and egg system formulated specifically for the steaming process (FIG. 4).

The recipes of the invention have further the advantage that a raw donut of the invention can be frozen, and can be stored in a frozen state. The raw donut (piece of batter in the form of a donut) can then be thawed and steamed at the user's convenience.

Alternatively, a donut of the invention may be frozen after steaming. The frozen (and steamed) donut can be subsequently thawed and eaten (or can be reheated in a steamer or microwave oven).

DETAILED DESCRIPTION

Donut Types and Ways of Preparing them (General)

The 2 most common types of donuts are the torus-shaped ring donut, and the filled donut, a flattened sphere injected with jam/jelly, cream, custard, or another sweet filling.

A small spherical piece of dough or batter, originally made from the middle of a ring donut, can be cooked (fried) as a donut hole.

Donuts can be formed either by joining the ends of a long, skinny piece of dough or batter into a ring, or by using a donut cutter which simultaneously cuts the outside and inside shape, leaving a donut-shaped piece of dough or batter and a donut hole from dough or batter removed from the center. This smaller piece of dough or batter can be cooked (fried) or re-added to the batch to make more donuts.

A disk-shaped donut can also be stretched and pinched into a torus until the center breaks to form a hole. Alternatively, a donut depositor can be used to place a circle of liquid dough or batter directly into the fryer.

Ringless donuts such as fritters and jelly donuts can be glazed and/or injected with jam or custard.

Ring donuts are often topped with a glaze icing or a powder such as cinnamon or sugar.

Conventional Fried Donut or Doughnut

A classical or conventional "doughnut", or "donut", is a sweet deep-fried piece of dough (yeast-raised donut) or batter (cake-donut).

Conventional yeast raised donuts and cake donuts contain approximately 25-30% fat of which 80-85% is absorbed frying fat. The level of fat absorption is dependent on the formulation, the equipment used to produce the donuts, and the frying shortening composition.

The frying times and frying temperatures vary for both types of donuts depending on raw weight, formulation, and type of fryer (retail or industrial fryer). Typically, the donuts are fried in "Donut Frying Shortening" at a temperature range of 185-196 degrees Celsius for 45-70 seconds per side (depending on the raw donut weight).

A finished fried donut has a very characteristic short bite and soft texture. The donut also has a smooth skin (with very minimum cracking), is symmetrical, and for donuts with a center hole, the center hole is pronounced.

Steamed Cake Donut of the Invention

The cake donut of the invention is obtained by cooking by steaming and as such is referred to as a (100% or fully) "steamed cake donut". The terms "steaming", "steam baking" and the like all refer to a process of cooking by steaming (only).

Like a fried donut, a steamed cake donut of the invention can be covered with glaze, icing, sugar and/or be filled as desired. Cake donuts of the invention can be hand-cut (hand-formed) or can be machine-cut.

The steamed cake donut of the invention has characteristics/properties similar to a (conventional) fried donut.

Desired characteristics of a donut are:
a stable and round structure,
good volume,
smooth and soft texture,
no, or only a minimal cracking on the surface, and
a short bite mouth feel.

A person skilled in the art will easily recognize the difference between a steamed cake donut according to the invention and a steamed bread or steamed cake.

"Steamed breads" are typically made of strong flour. The resulting dough is extremely viscous. The finished steamed bread has a chewy crumb structure similar a regular baked bread or roll or bun.

"Steamed cakes" use a soft wheat flour which results in a batter that is very low in viscosity and will not maintain a donut type shape. The finished steamed cake does not yield the desired donut symmetry or short bite that is typical of a fried donut (conventional donut) or steamed cake donut (donut according to the invention).

Unlike fried and baked donuts (donuts baked e.g. in a deck or convection oven at e.g. 180-220° C.) no crust is formed when steaming a donut. In particular, a steamed cake donut of the invention is crust-free.

The term "crust" refers to the hard and crispy outer portion of surface area of a donut. During the fast heat transfer during the baking or frying process, the donut surface becomes crisp and brown.

During a steaming process (like in the invention), the donut surface does not form the typical brown crust and presents a moist and cohesive surface rather than the crust formed by baking or frying (FIG. 4 compared to FIG. 2).

Although a "baked donut" may have a reduced fat content compared to a fried donut, the eating characteristics are much different (much drier crumb and crust e.g.) from that of a steamed cake donut of the invention (moist crumb and cohesive donut surface).

Examples

Recipes

Conventional Cake Donut Batter:

| | |
|---|---|
| Wheat flour | 35-45% |
| Water | 29-32% |
| Sugar | 15-20% |
| Vegetable oil | 2-3% |
| Dextrose | 1-2% |
| Leavening system: E500ii-E341i-E450i | 1.5-1.75% |
| Defatted soy flour | 1-3% |
| Egg yok powder | 0.5-2% |
| Iodized salt | 0.5-1% |
| Starch | 0-1.25% |
| Emulsifier: E471- E322 | 0-0.5% |
| Milk protein | 0-3% |
| Hydrocolloids: E412 | 0-0.3% |
| Colorings & flavorings | 0-1% |

Batter Recipe for a Steamed Chocolate Cake Donut of the Invention:

| | |
|---|---|
| Wheat flour | 25-35% |
| Water | 23-27% |
| Sugar | 15-20% |
| Vegetable oil | 4-6% |
| Vegetable shortening | 4-6% |
| Cocoa powders | 3-5% |
| Dextrose | 0-1% |
| Leavening system: E500ii-E450i | 0.75-1.25% |
| Egg yolk powder | 6-8% |
| Iodized salt | 0.5-1% |
| Starch | 0-1.25% |
| Emulsifier: E471- E322 | 0-0.5% |
| Milk protein | 0-3% |
| Hydrocolloids: E412 - E414 | 0-3% |
| Colorings & flavorings | 0-1% |

Batter Recipe for a Steamed Vanilla Cake Donut of the Invention

| | |
|---|---|
| Wheat flour | 25-35% |
| Water | 23-27% |
| Sugar | 15-20% |
| Vegetable oil | 4-6% |
| Vegetable shortening | 4-6% |
| Dextrose | 0-1% |
| Leavening system: E500ii-E450i | 0.75-1.25% |
| Egg yolk powder | 6-8% |
| Iodized salt | 0.5-1% |
| Starch | 0-1.25% |
| Emulsifier: E471- E322 | 0-0.5% |
| Milk protein | 0-3% |
| Hydrocolloids: E412 - E414 | 0-3% |
| Colorings & flavorings | 0-1% |

Process for Hand Cut Donuts:
From Mix to Cut Raw Donut

The temperature (t°) of the water added to the batter is calculated according to the following formula:

$$3 \times \text{ideal } t° \text{ of the batter before frying} = t° H_2O + t° \text{ bakery} + t° \text{ mix}$$

The ideal temperature of the batter before frying is 22.8 +/−1° C. The temperature of the water is therefore:
t° H$_2$0=68.4−t° bakery−t° mix, wherein t° bakery is the room temperature and t° mix is the temperature of the mix.

This formula is adapted from a formula well known in the art (such as in Dubois D et al., AIB Technical Bulletin, Vol I, Issue No 7) and can be applied for (conventional) fried donuts as well as for a steamed cake donut according to the invention.

All dry ingredients are first mixed together. The water is then added and the batter is mixed two minutes at low speed with a mixer using a "paddle attachment".

After a rest period of ten minutes, the batter is transferred onto a flour dusted bakery bench and the cake donut batter is pinned out to a thickness of approximately 1 to 1.5 cm. With a handheld ring donut cutter the raw donuts are cut from the sheeted batter.

Fried Cake Donuts:

The cut donuts are placed directly onto a frying screen. The screen is then inserted directly into the donut fryer. The donuts are fried in oil at 190° C. for 45 seconds on the first side and 45 seconds on the second side. The fried donuts are removed from the donut fryer via a donut cradle.

Steamed Cake Donuts:

The cut donuts are placed directly onto special steamer pans. These pans are then inserted into a steaming machine. The donuts are then steamed (at about 100 deg. C.) for approximately four to six minutes.

Process For Machine Cut Donuts:
From Mix to Cut Raw Donut

For the water temperature, see above.

All dry ingredients are first mixed together. The water is then added and the batter is mixed first for one minute at low speed and two minutes at medium speed with a mixer using a "paddle attachment".

After a rest period of ten minutes, the batter is transferred into a cake donut depositor.

Fried Cake Donuts:

Deposit the cake donut batter directly into the donut fryer (via the cake donut depositor).

The donuts are fried in oil at 190° C. for 45 seconds on the first side (flipped) and 45 seconds on the second side. The fried donuts are removed from the donut fryer via a donut cradle.

Steamed Cake Donuts:

Use the cake donut depositor to deposit the donut batter onto special steamer pans. These pans are then inserted into a steaming machine. The donuts are then steamed (at around 100 deg. C.) for approximately four to six minutes.

Fried and steamed donuts were prepared from both a conventional batter and a batter according to the invention. The results are discussed below.

Results
Conventional Mix—Fried

Fried cake donuts (whether hand cut or machine cut) are very symmetrical with good volume and typical short bite. Fat absorption is normal. An example of a fried conventional cake donut is given in FIG. 2.

Conventional Mix—Steamed

Results for hand cut donuts: The donut holes are not visible and the donuts are very chewy and dry. Cracking also appears on the surface of the donuts.

Results for machine cut donuts: Donuts have an irregular volume and symmetry, cracks are present on the surface of the donut, and the donuts are chewy and dry. The donut holes are again, not visible.

An example of a steamed cake donut prepared from a conventional mix (for fried donuts) is shown in FIG. 3.

Steamed Cake Donut Mix of the Invention—Steamed

Results for hand cut donuts: Cake donuts are very symmetrical with good volume. Cake donuts have a smooth and soft structure. There is no cracking on the surface, donut hole is visible and donut crumb is soft with a short bite (similar to a conventional cake donut).

Results for machine cut donuts: Cake donuts are very symmetrical with good volume. Cake donuts have a smooth and soft structure. There is no cracking on the surface, donut hole is visible and donut crumb is soft with a short bite (similar to a conventional cake donut).

An example of a steamed cake donut prepared from a mix of the invention is shown in FIG. 4. Please note the absence of a crust.

Steamed Cake Donut Mix of the Invention—Fried

Results for hand cut donuts: Donuts have excessive fat absorption, poor symmetry, and an unpleasant mouthfeel.

Results for machine cut donuts: Donuts have excessive fat absorption, poor symmetry, blisters on donut surface, and an unpleasant mouthfeel.

Figure 5:
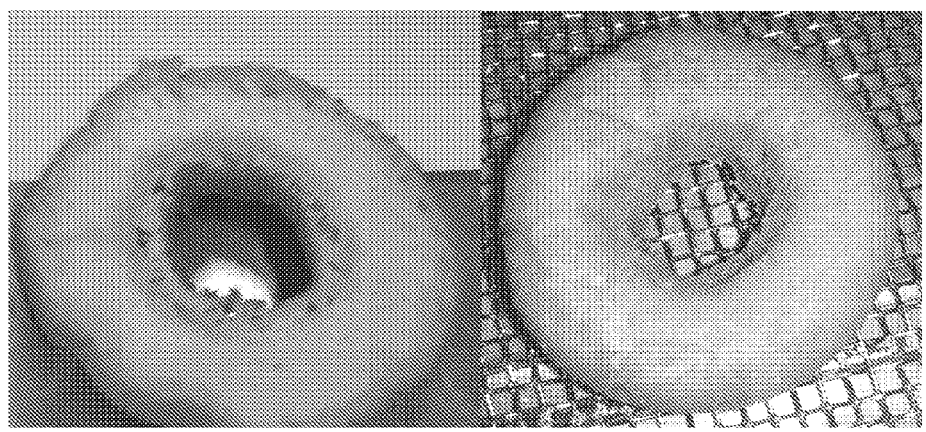
FIG. 5 presents a fried machine-cut cake donut prepared according to a recipe of the invention: interior (left), exterior (right).

An example of a fried cake donut prepared from a mix according to the invention is shown in FIG. 5.

The invention claimed is:

1. A method for preparing a cake donut, said method comprising the steps of providing a batter, forming a donut piece out of said batter and cooking the donut piece by steaming using an external source of steam at about 100° C. for at least 2 minutes, wherein the total fat content of the obtained cake donut is between 7% and 18%.

2. The method according to claim 1, wherein the donut piece is steamed for 4 up to 6 minutes.

3. The method of claim 1, wherein the temperature of the cake donut batter before steaming is around 20 to 25° C.

4. The method of claim 1, wherein said batter comprises:
water added in an amount comprised between 20 wt % and 35 wt %,
wheat flour in an amount comprised between 20 wt % and 40 wt %,
a chemical leavening system comprising a carbon dioxide carrier and one or more leavening acids with a rate of reaction comprised between 15 and 45, said leavening system being present in an amount comprised between 0.5 wt % and 1.40 wt %,
sugar in an amount comprised between 15 wt % and 25 wt %,
egg yolk being present in an amount comprised between 2 wt % and 7 wt %,
emulsifiers in an amount comprised between 0.1 wt % and 3 wt %,
edible fat in an amount for reaching a total fat content that is comprised between 7% and 18%,
at least one enzyme for assuring a short bite and soft mouthfeel, said enzyme(s) being present in an amount comprised between 0.01 wt % and 1.5 wt %,
milk proteins in an amount comprised between 0.1 wt % and 3 wt %,
salt in an amount comprised between 0.1 wt % and 3 wt %,
starch in an amount comprised between 0.1 wt % and 4 wt %, and hydrocolloids in an amount comprised between 0.1 wt % and 2 wt %, the total sum of ingredients not exceeding 100 wt %.

5. The method of claim 1, wherein said batter is prepared from a mix comprising:
   wheat flour in an amount comprised between 30 wt % and 50 wt %,
   a chemical leavening system comprising a carbon dioxide carrier and one or more leavening acids with a rate of reaction comprised between 15 and 45, said leavening system being present in an amount comprised between 0.75 wt % and 2 wt %,
   sugar in an amount comprised between 22 wt % and 32 wt %,
   egg yolk in an amount comprised between 3 wt % and 10 wt %,
   emulsifiers in an amount comprised between 0.1 wt % and 4 wt %, and edible fat in an amount for reaching a total fat content that is comprised between 6% and 16%.

6. The method of claim 5, wherein said mix further comprises at least one enzyme for assuring a short bite and soft mouthfeel, said enzyme(s) being present in an amount comprised between 0.01 wt % and 2 wt %.

7. The method of claim 1, wherein the donut piece is not fried or baked.

8. A cake donut obtained by the method according to claim 1.

* * * * *

UNITED STATES PATENT AND TRADEMARK OFFICE
CERTIFICATE OF CORRECTION

PATENT NO. : 8,889,202 B2  
APPLICATION NO. : 12/672661  
DATED : November 18, 2014  
INVENTOR(S) : Paul Baisier It is certified that error appears in the above-identified patent and that said Letters Patent is hereby corrected as shown below:

In the claims

In column 19 at line 19, In Claim 5, change "6%" to --8%--.

Signed and Sealed this
Twenty-second Day of December, 2015

Michelle K. Lee
*Director of the United States Patent and Trademark Office*